United States Patent [19]

Karasudani

[11] 4,191,278
[45] Mar. 4, 1980

[54] SLIDABLE SUPPORT STRUCTURE FOR A DISC BRAKE CALIPER

[75] Inventor: Yasuo Karasudani, Yokohama, Japan
[73] Assignee: Tokico Ltd., Kanagawa, Japan
[21] Appl. No.: 694,037
[22] Filed: Jun. 8, 1976

[30] Foreign Application Priority Data

Jun. 18, 1975 [JP] Japan .................................. 50/74172

[51] Int. Cl.² ............................................. F16D 65/02
[52] U.S. Cl. .................................................. 188/73.3
[58] Field of Search ................... 188/71.1, 73.3, 72.4, 188/73.6, 73.4, 73.5

[56] References Cited

U.S. PATENT DOCUMENTS

| | | | |
|---|---|---|---|
| 3,848,709 | 11/1974 | Tourneur | 188/73.3 |
| 3,893,546 | 7/1975 | Kestermeier et al. | 188/73.3 |
| 3,915,263 | 10/1975 | Courbot | 188/73.3 |
| 3,917,033 | 11/1975 | Rath et al. | 188/73.3 |
| 3,942,611 | 3/1976 | Burnett | 188/73.3 |
| 3,958,667 | 5/1976 | deGennes | 188/73.3 |
| 3,976,169 | 8/1976 | Ogawa | 188/73.3 |
| 3,999,635 | 12/1976 | Hotchkiss | 188/73.6 |

FOREIGN PATENT DOCUMENTS

| | | | |
|---|---|---|---|
| 1555241 | 1/1969 | France | 188/73.3 |
| 47-43704 | 11/1972 | Japan | 188/73.3 |
| 920196 | 3/1963 | United Kingdom | 188/73.6 |

*Primary Examiner*—Edward R. Kazenske
*Attorney, Agent, or Firm*—Wenderoth, Lind & Ponack

[57] ABSTRACT

A disc brake has a stationary supporting member straddling a rotatable disc for supporting a pair of friction pads slidable on the opposite sides of the disc, and a caliper slidably mounted on the supporting member and carrying an actuator on one side of the disc. The caliper is mounted slidably and pivotally relative to the disc by a single pin, and the caliper engages with one of the friction pads such that the pivotal movement of the caliper is prevented.

2 Claims, 3 Drawing Figures

SLIDABLE SUPPORT STRUCTURE FOR A DISC BRAKE CALIPER

This invention relates to disc brakes of the kind comprising a stationary supporting member straddling a rotatable disc and secured to the body of a vehicle, a pair of friction pads fitted slidably in the supporting member, and a caliper slidably mounted on the supporting member for applying the friction pads against the opposite surfaces of the disc.

In a prior art disc brake of the aforementioned kind two openings are formed respectively in two arm portions of the stationary supporting member for slidably receiving two pins which are respectively secured to the opposite ends of the caliper and extend in the axial direction of the disc. Since the caliper is mounted on the supporting member by two pins, it is necessary to control the spacing and dimension of the pins accurately which tends to increase the manufacturing and assembling costs of the disc brake. Further, it has been difficult to replace the friction pads since the friction pads are surround by the caliper.

An object of the present invention is to provide a disc brake which overcomes prevent the aforementioned shortcomings of the prior art disc brakes.

According to the present invention there is provided a disc brake of the aforementioned kind in which the caliper is mounted on the supporting member by a single pin which is received slidably and rotatably in a bore, and the pivotal movement of the caliper is normally prevented by engaging the caliper with at least one of the friction pads.

Preferably, the pin is secured to a circumferentially extending arm portion of the caliper and the bore is formed in the supporting member, and the pivotal movement of the caliper is prevented by a circumferentially elongated opening formed in the back plate of the indirectly actuated friction pad which receives an axial projection mounted on a portion of the caliper straddling the disc for urging the indirectly actuated friction pad against the disc.

Further objects and effects of the present invention will be more apparent from the following description thereof with reference to the drawings in which.

Figure 1:
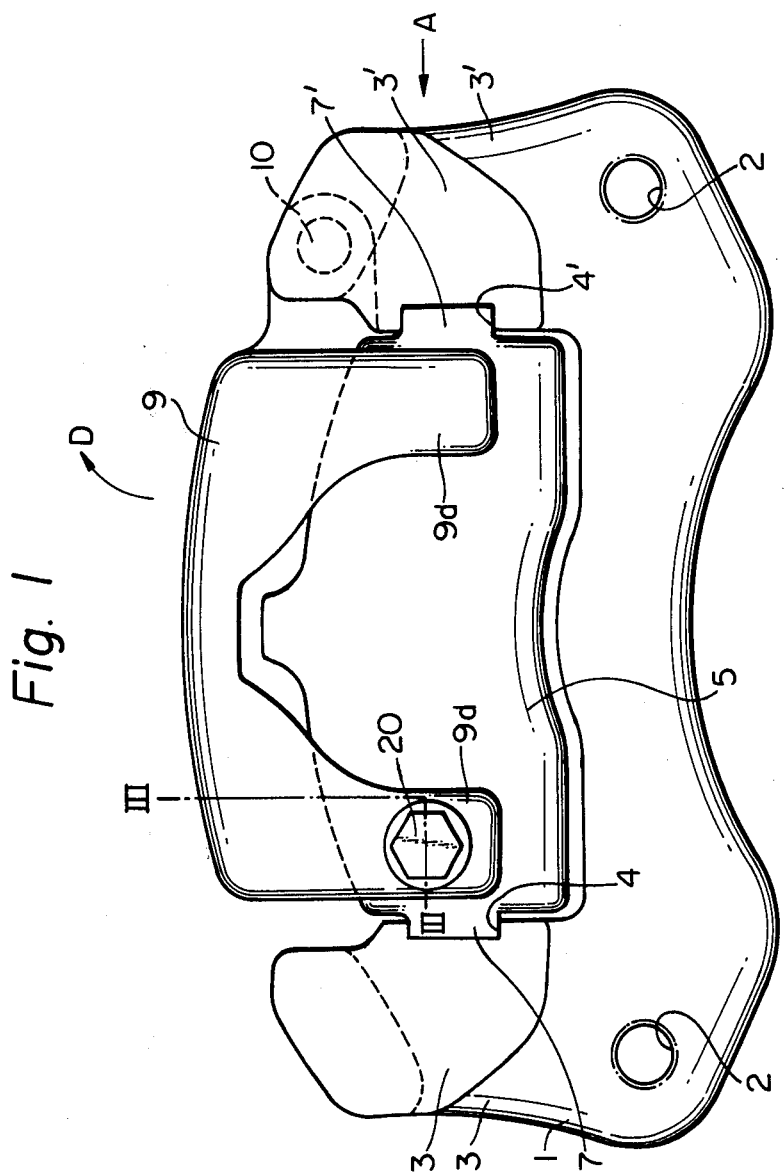
FIG. 1 is an end view of a disc brake exemplifying the present invention.

The disc brake shown in the drawings comprises a stationary supporting member 1 having threaded openings for securing the member 1 to a non-rotatable part of a vehicle such as a wheel suspension knuckle or the like. The supporting member 1 has a generally U-shaped configuration as viewed in the direction of arrow A in FIGS. 1 and 3 for straddling a portion of the periphery of a rotatable disc (not shown).

Axially extending slots or recesses 4 and 4' are formed respectively in arm portions 3 and 3' of the supporting member 1 for slidably receiving friction pads 5 and 6. Projections 7 and 7' and 8 and 8' formed on the opposite ends of respective friction pads 5 and 6 engage with the slots 4 and 4' respectively.

Figure 3:
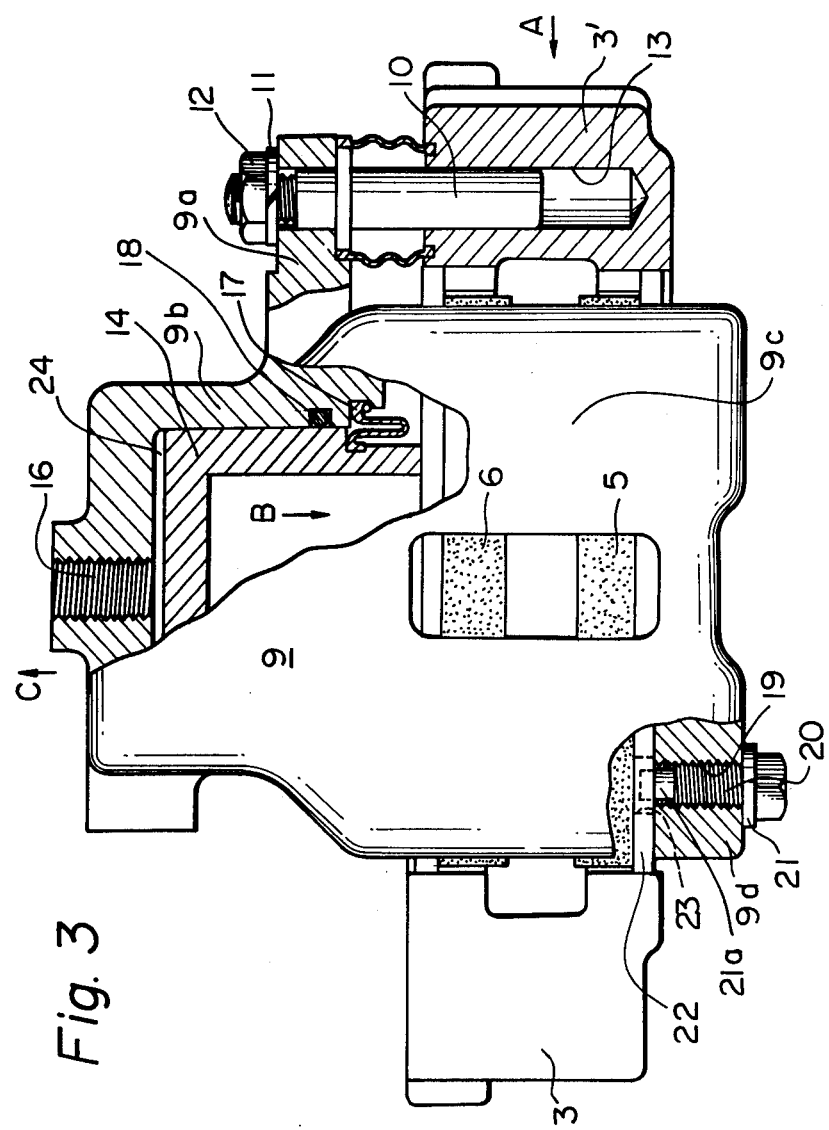
FIG. 3 is a plan view of the disc brake of FIGS. 1 and 2, partially broken away and the cross-section portions of which are taken along line III—III in FIG. 1 and along line III'—III' in FIG. 2.

Designated at 9 is a caliper having arm portion 9a extending rightward as viewed in FIG. 3 for mounting a pin 10 which is secured to the arm portion 9a by a spring washer 11 and a nut 12. The pin 10 is slidably received in a bore 13 formed in the arm portion 3' of the supporting member 1.

The upper portion of the caliper 9 as viewed in FIG. 3 constitutes a cylinder portion 9b for slidably receiving a piston 14 therein. When liquid under pressure is supplied into the cylinder portion 9b through a port 16, the piston 14 urges the friction pad against one surface of the disc. Conventional boot 17 and seal 18 are disposed between the piston 14 and the caliper 9.

The caliper 9 comprises a bridge portion 9c straddling the disc and two leg portions 9d extending radially inwardly of the disc along the rear surface of the friction pad 5. In one of the leg portions 9d which is remote from the arm portion 9a there is provided an internally screw threaded bore 19 for receiving a bolt 20. The free end portion 20a of the bolt 20 engages with a circumferentially elongated opening 23 formed in a back plate 22 of the friction pad 5. The opening 23 allows the circumferential movement of the friction pad 5 relative to the bolt 20 when being subjected to braking torque during application of the brake, and prevents distortion of the bolt 20 and/or circumferential movement of the caliper 9.

Figure 2:
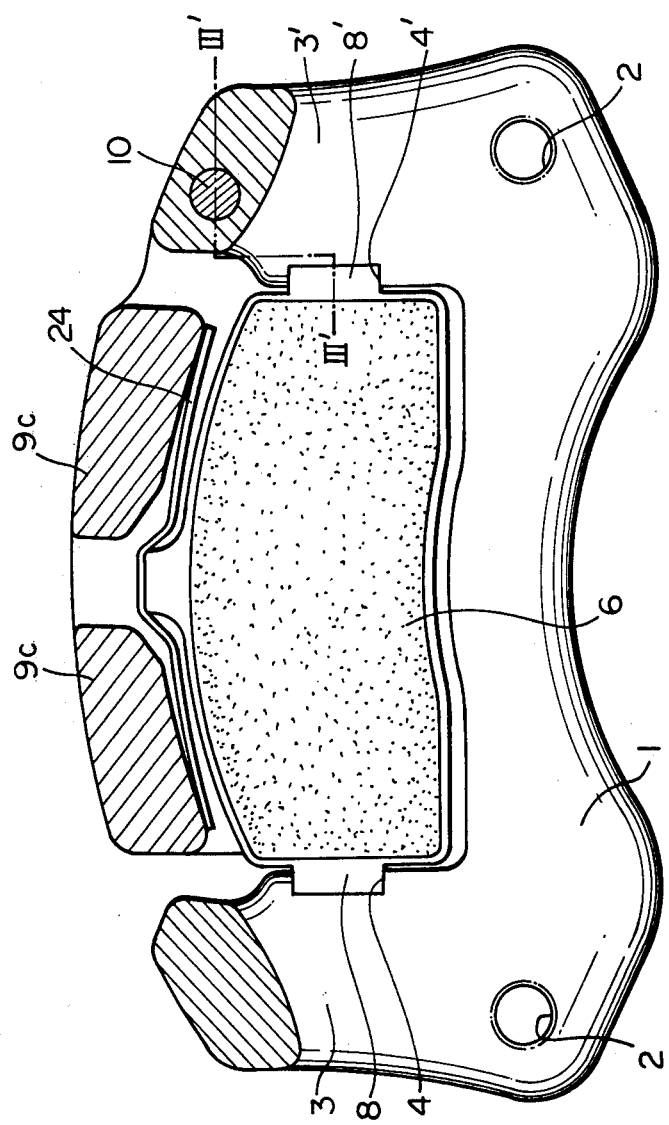
FIG. 2 is a cross-sectional end view taken along the surface of a rotatable disc.

As shown in FIG. 2, a plate spring 24 is disposed between the bridge portion 9c of the caliper 9 and the friction pads 5 and 6 for taking up radial and/or circumferential clearance between the friction pads 5 and 6 and the caliper 9 for suppressing noise and improving vibration characterisitics of the brake.

In operation, when liquid under pressure supplied from a master cylinder (not shown) is introduced into a cylinder portion 9b through the port 16, the piston 14 moves in the direction of arrow B in FIG. 3 to urge the friction pad 6 against one surface of the disc. The caliper 9 moves in the direction of arrow C due to the reaction force to urge the friction pad 5 against the other surface of the disc which movement of the caliper is guided by the sliding movement of the pin 10 within the bore 13.

In replacing the friction pads 5 and 6 by, for example, new and unworn friction pads, the caliper 9 is rotated in the direction of arrow D in FIG. 1 by removing the bolt 20 from the leg portion 9d of the caliper or by disengaging the tip end 21a of the bolt 20 from the opening 23 in the friction pad 5 by moving the caliper 9 in the direction of arrow B as viewed in FIG. 2. By rotating the caliper 9 in the direction of arrow D, the friction pads 5 and 6 can easily be axially removed from the supporting member 1.

In the embodiment, the pin 10 and the bolt 20 are secured to the caliper for cooperating with the bore 13 and the opening 23 formed respectively in the supporting member 1 and the friction pad 5. It will be noted that the bore 13 and the opening 23 can be formed in the caliper for cooperating with the pin 10 and the bolt 20 which may be secured respectively to the supporting member and the friction pad.

As heretofore described, the disc brake according to the present invention comprises a stationary supporting member secured to a non-rotatable part of a vehicle and straddling a rotatable disc, a pair of friction pads disposed on opposite sides of the disc and fitted slidably in the supporting member, a caliper slidably mounted on the supporting member by a single pin which is rotatably and slidably received in a bore, an actuator mounted in the caliper for urging one of the friction pads against one side surface of the disc, said caliper includes a portion straddling the disc for urging the other friction pad against the other surface of the disc, and said caliper engages with one of the friction pads such that the pivotal movement of the caliper around the pin is prevented by the engagement. Thus, the axial movement of the caliper is guided by a single pin which alleviates the tolerance requirements in manufacturing parts and simplifies the assembling operation. Further, since the sliding movement is effected at a single position failure caused by rust or dirt will be minimized.

In exchanging friction pads, the friction pads can easily be exposed by moving the caliper axially an amount required to disengage the cylindrical portion 21a of the bolt 20 from the opening 23 and rotating the caliper around the pin 10.

I claim:

1. A disc brake comprising a disc having an axis and first and second opposite faces; a torque taking member fixed relative to said disc and provided with slide surfaces; first and second friction elements provided with slide surfaces and disposed adjacent to said first and second opposite faces respectively, said slide surfaces of said first and second friction elements cooperating with said slide surfaces of said torque taking member such that said first and second friction elements are slidably carried and at least said first friction element is restraind against movement radially of said axis of said disc by said torque taking member; a caliper member arranged to straddle said disc and to move said first and second friction elements against said first and second opposite faces respectively for braking, said caliper member having front and rear limbs disposed adjacent said first and second friction elements respectively, a crown portion joining said limbs, and first and second sides; a slidable assembly mounting said caliper member on said torque taking member, said assembly comprising only a single pin extending directly between said caliper and torque taking members, releasable connection means securing said single pin to one of said torque and caliper members on said first side of said caliper member, and an opening in the other of said torque and caliper members slidable receiving said pin, said pin being spaced from said friction elements, and inter-engaging projection and recess means on said first friction element and said caliper member on said second side of said caliper member and comprising a recess in a portion of said first friction element defined by an elongated slot whose longitudinal dimension is greater than its transverse dimension, said longitudinal dimension extending generally towards the axis of the pin, and a projection carried by said caliper member and engaged within said slot so as to hold said caliper member against pivotal movement about the axis of said pin, said projection having play along said slot.

2. A disc brake according to claim 1 wherein said projection is a screw extending through said caliper, the screw having a cylinder tip end engaging in said slot.

* * * * *